July 19, 1966  R. M. FOCHT  3,261,738
APPARATUS FOR PLATING BRICKS
Filed Nov. 29, 1962  15 Sheets-Sheet 1
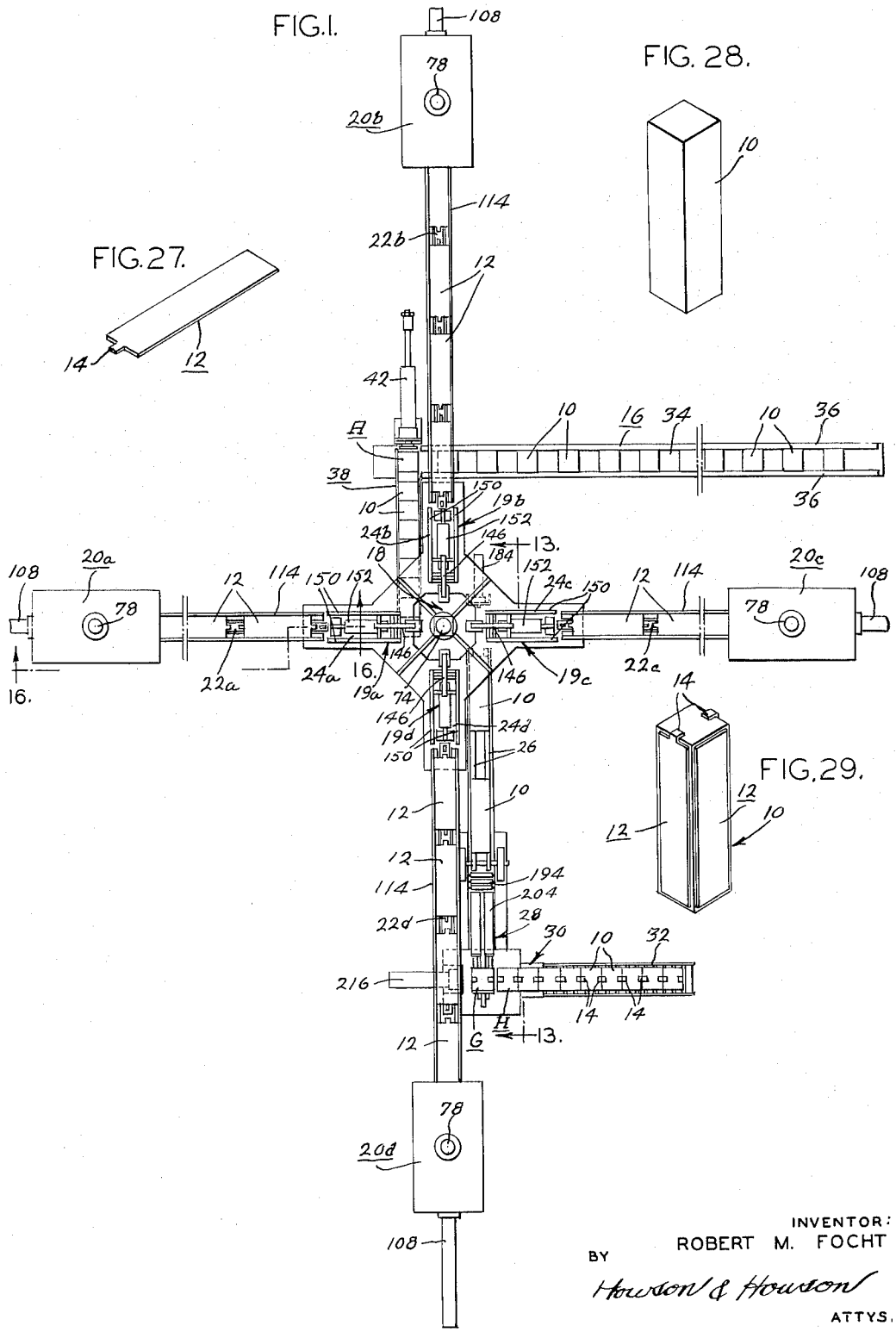
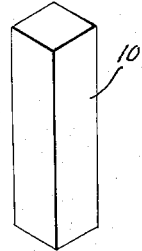
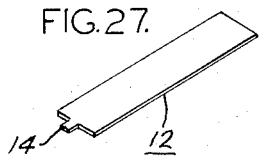
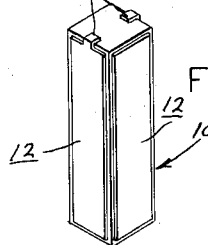
INVENTOR:
ROBERT M. FOCHT
BY Howson & Howson
ATTYS.

July 19, 1966  R. M. FOCHT  3,261,738
APPARATUS FOR PLATING BRICKS
Filed Nov. 29, 1962  15 Sheets-Sheet 2

INVENTOR:
ROBERT M. FOCHT
BY
Howson & Howson
ATTYS

July 19, 1966  R. M. FOCHT  3,261,738
APPARATUS FOR PLATING BRICKS
Filed Nov. 29, 1962  15 Sheets-Sheet 3

INVENTOR:
ROBERT M. FOCHT
BY
Howson & Howson
ATTYS

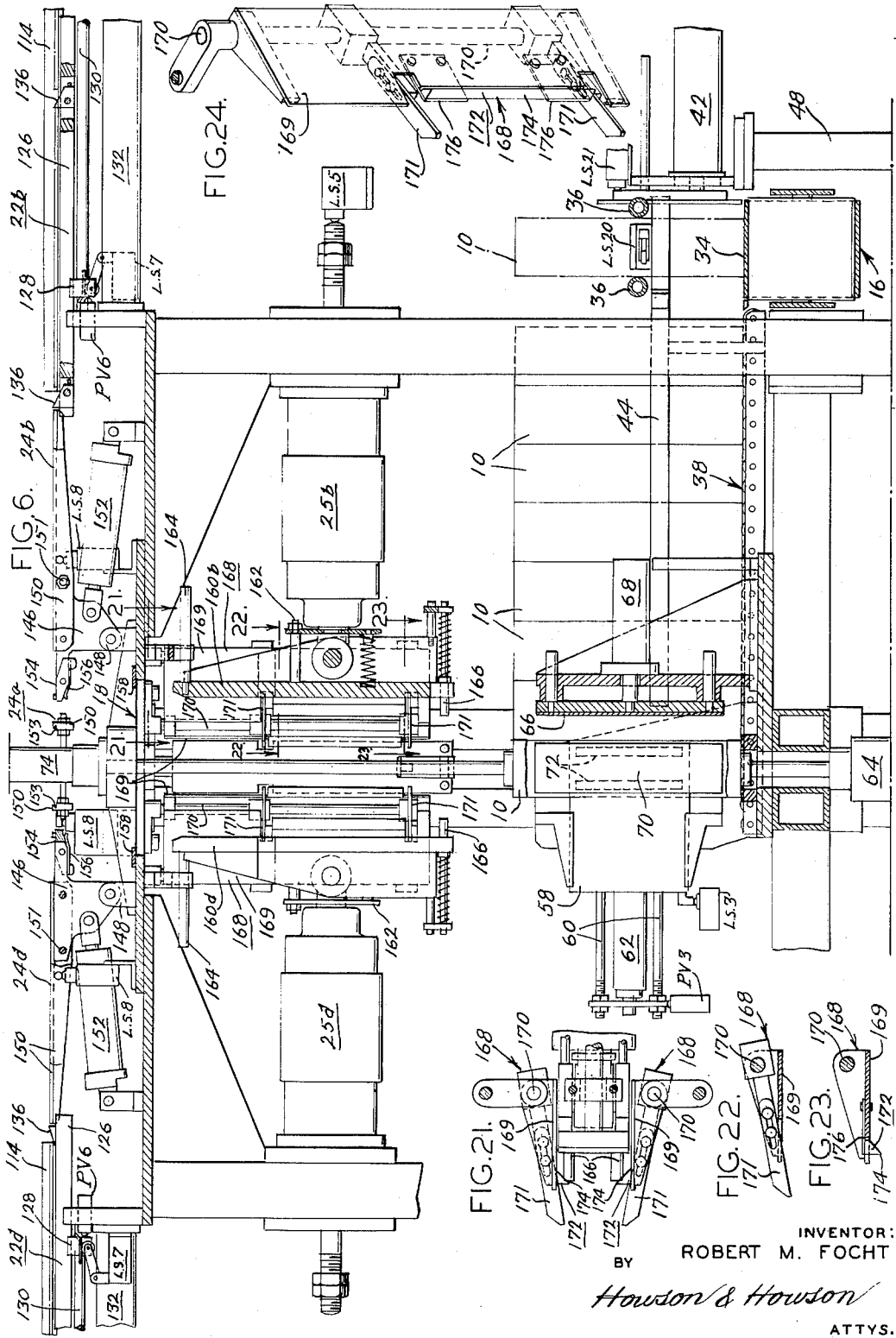

July 19, 1966
R. M. FOCHT
3,261,738
APPARATUS FOR PLATING BRICKS
Filed Nov. 29, 1962
15 Sheets-Sheet 5
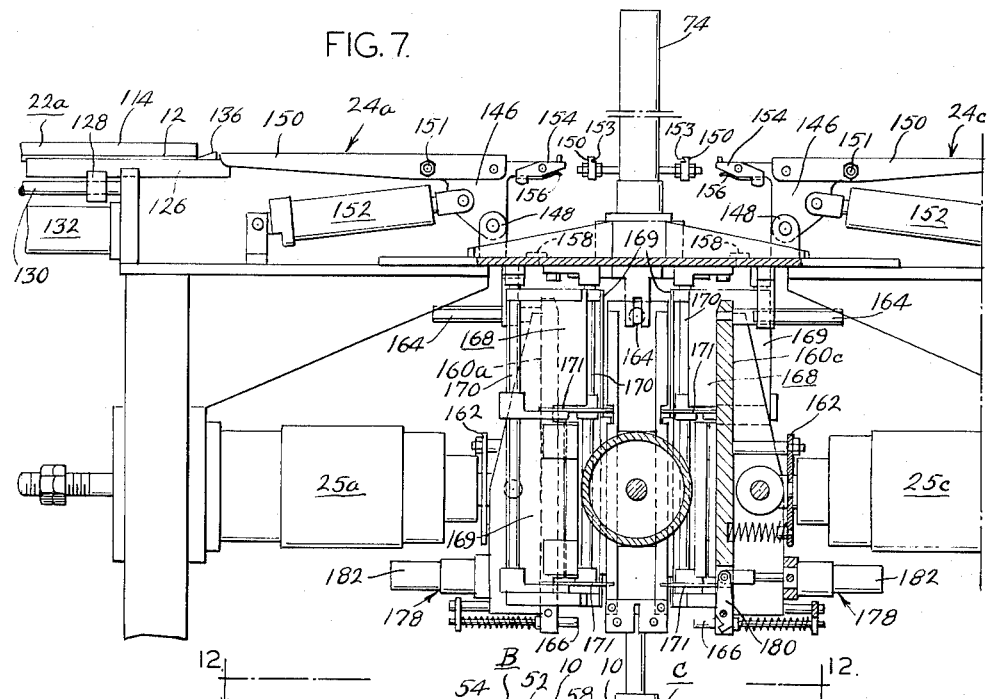
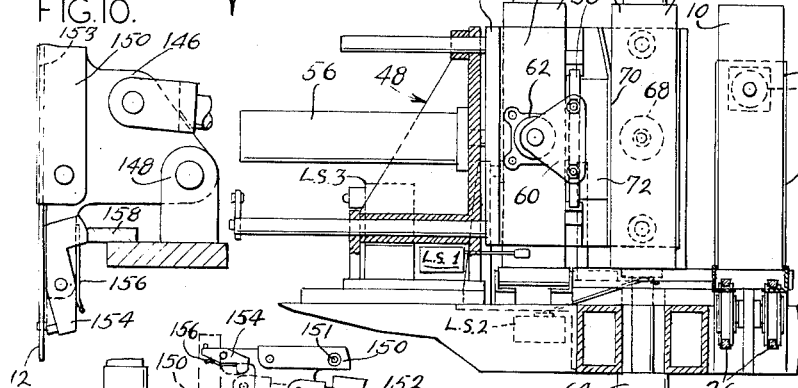
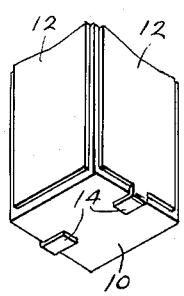
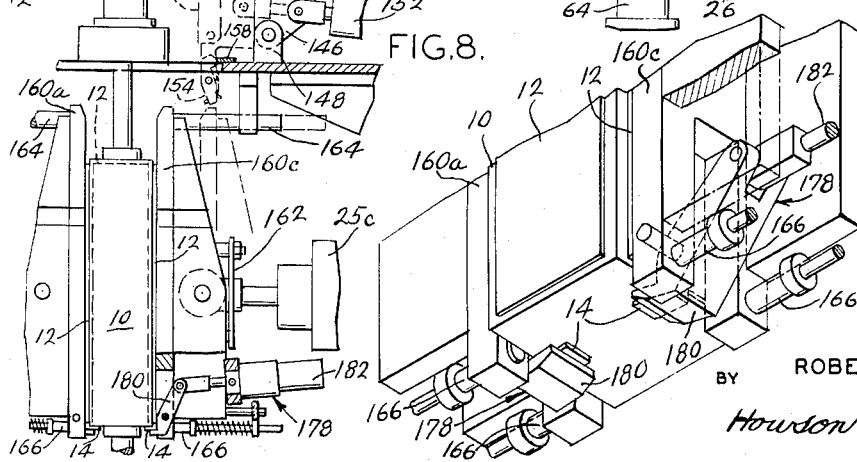
INVENTOR:
ROBERT M. FOCHT
BY Howson & Howson
ATTYS.

July 19, 1966  R. M. FOCHT  3,261,738
APPARATUS FOR PLATING BRICKS
Filed Nov. 29, 1962  15 Sheets-Sheet 6
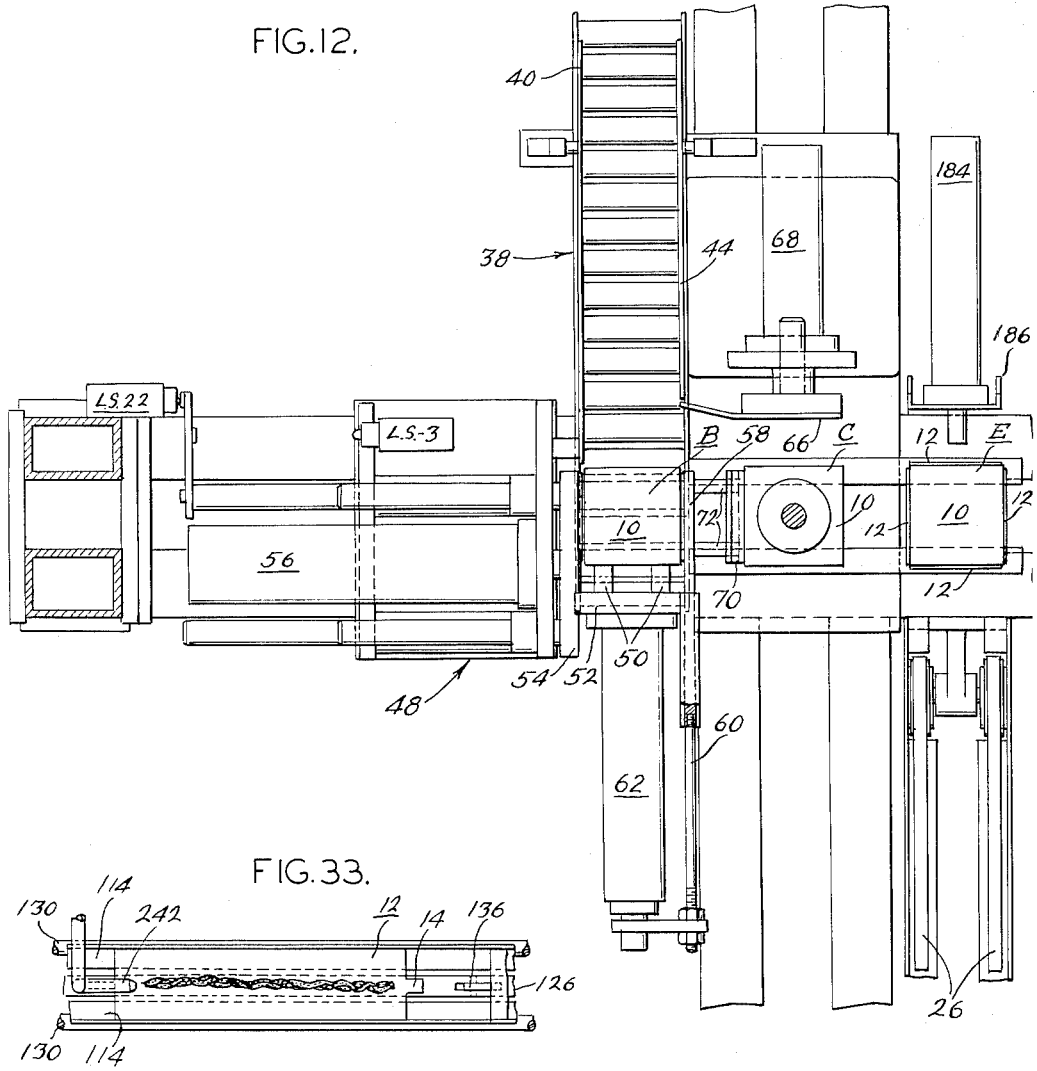
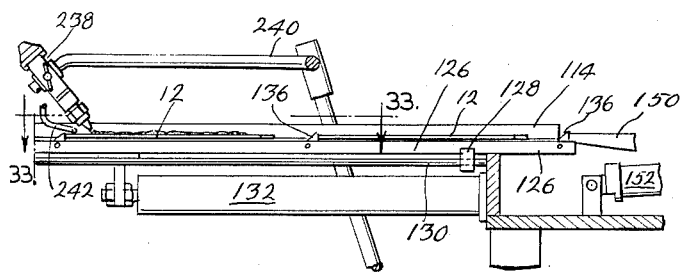
INVENTOR
ROBERT M. FOCHT
BY
Howson & Howson
ATTYS

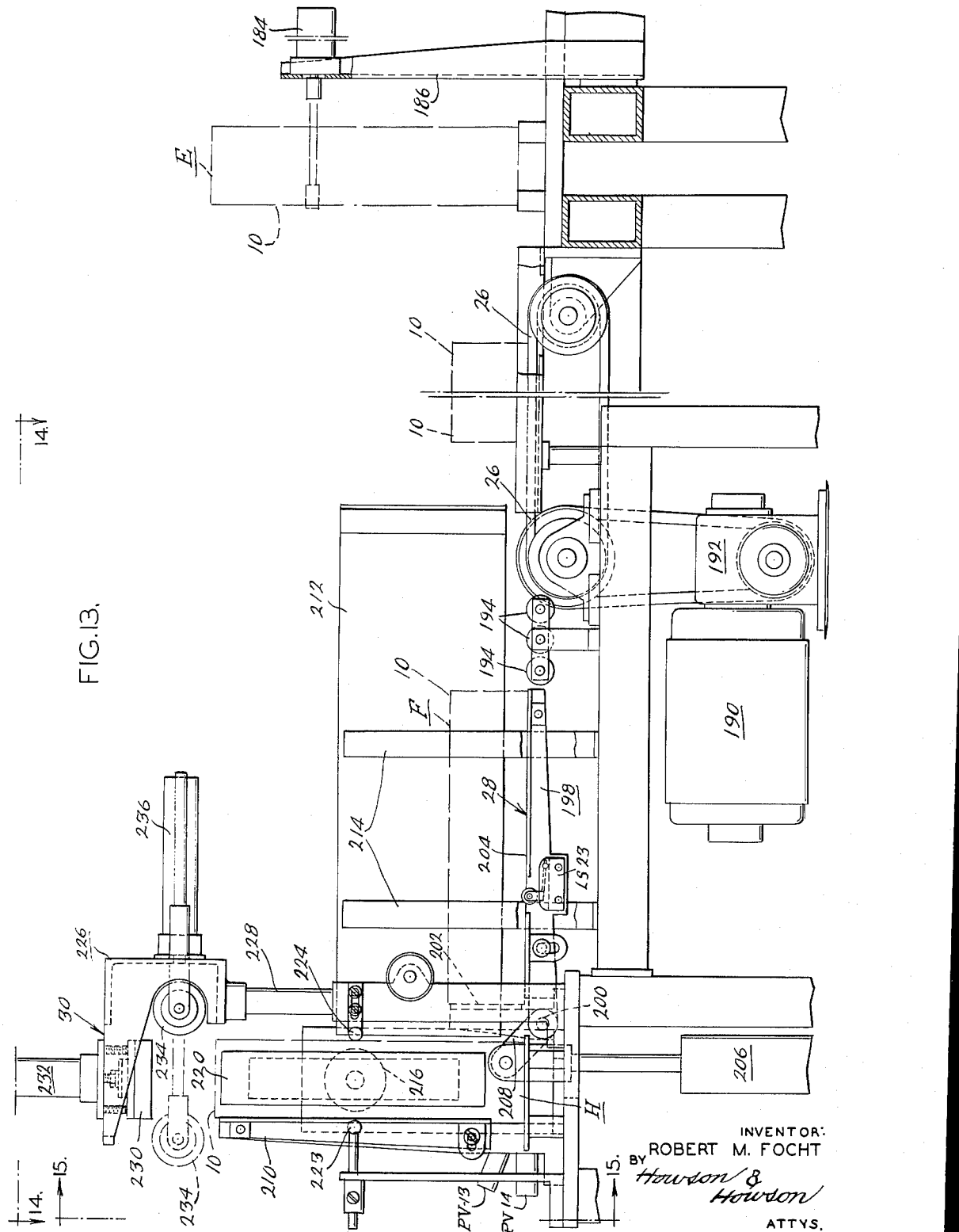

July 19, 1966 R. M. FOCHT 3,261,738
APPARATUS FOR PLATING BRICKS
Filed Nov. 29, 1962 15 Sheets-Sheet 8

INVENTOR
ROBERT M. FOCHT
BY Howson & Howson
ATTYS

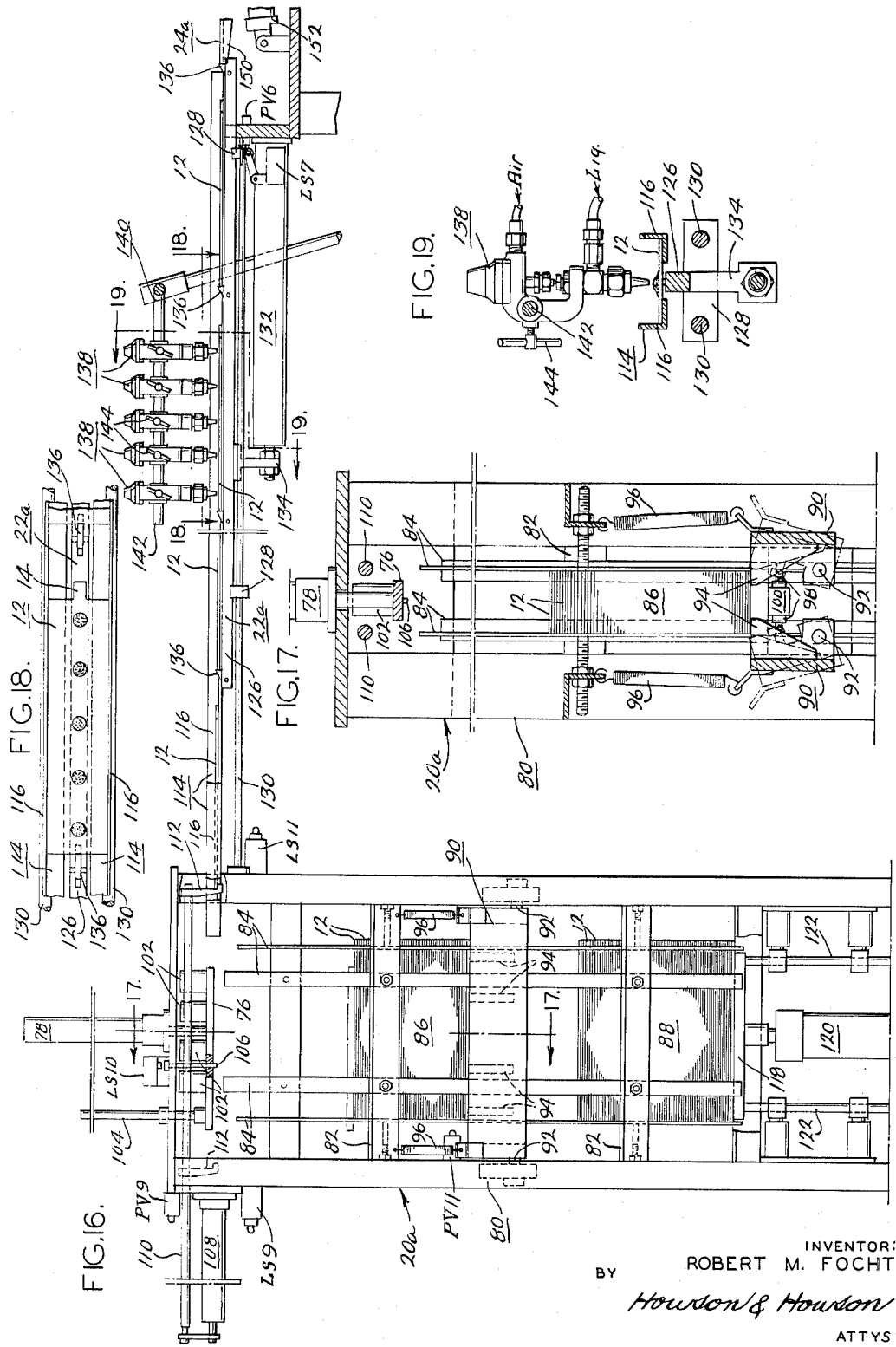

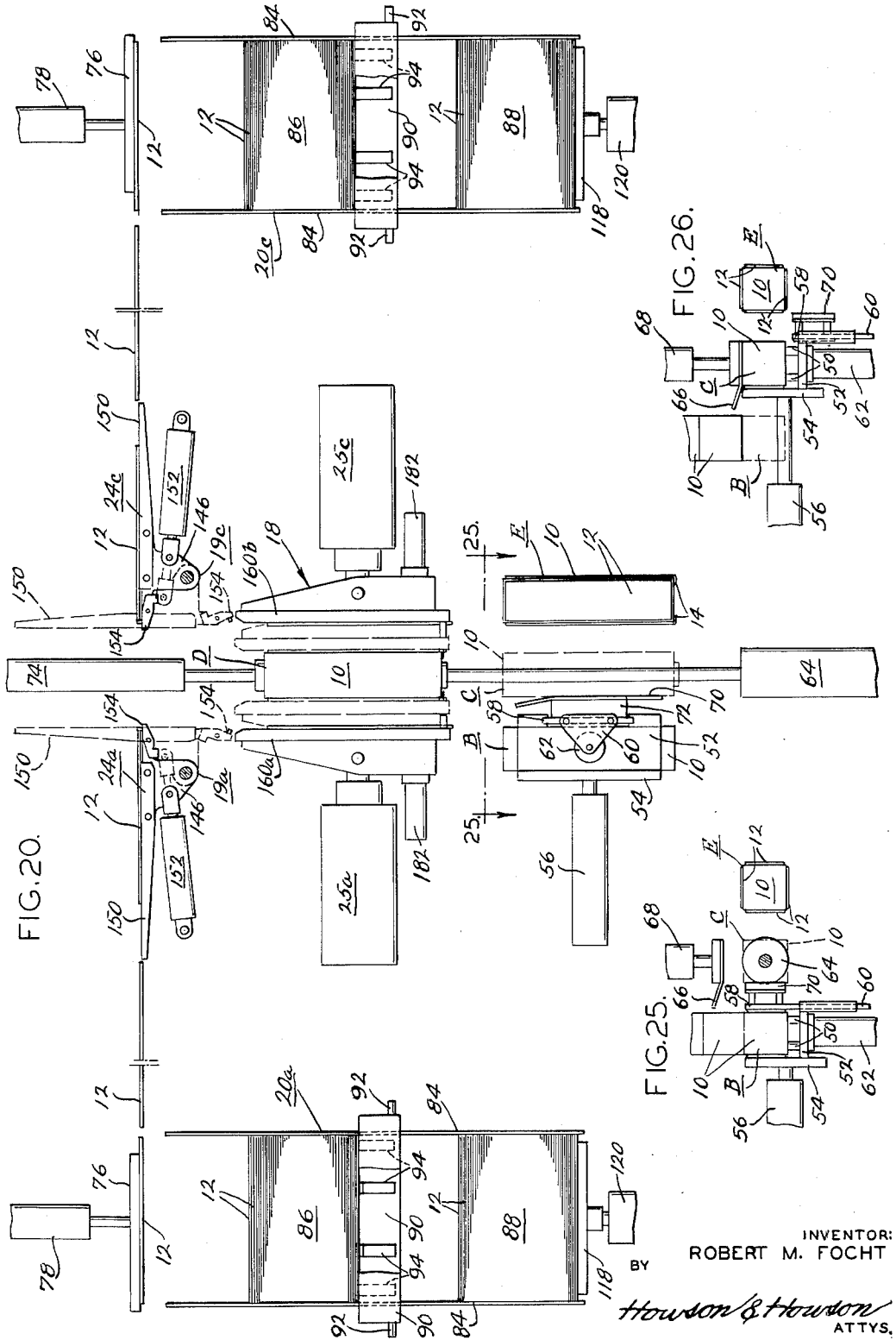

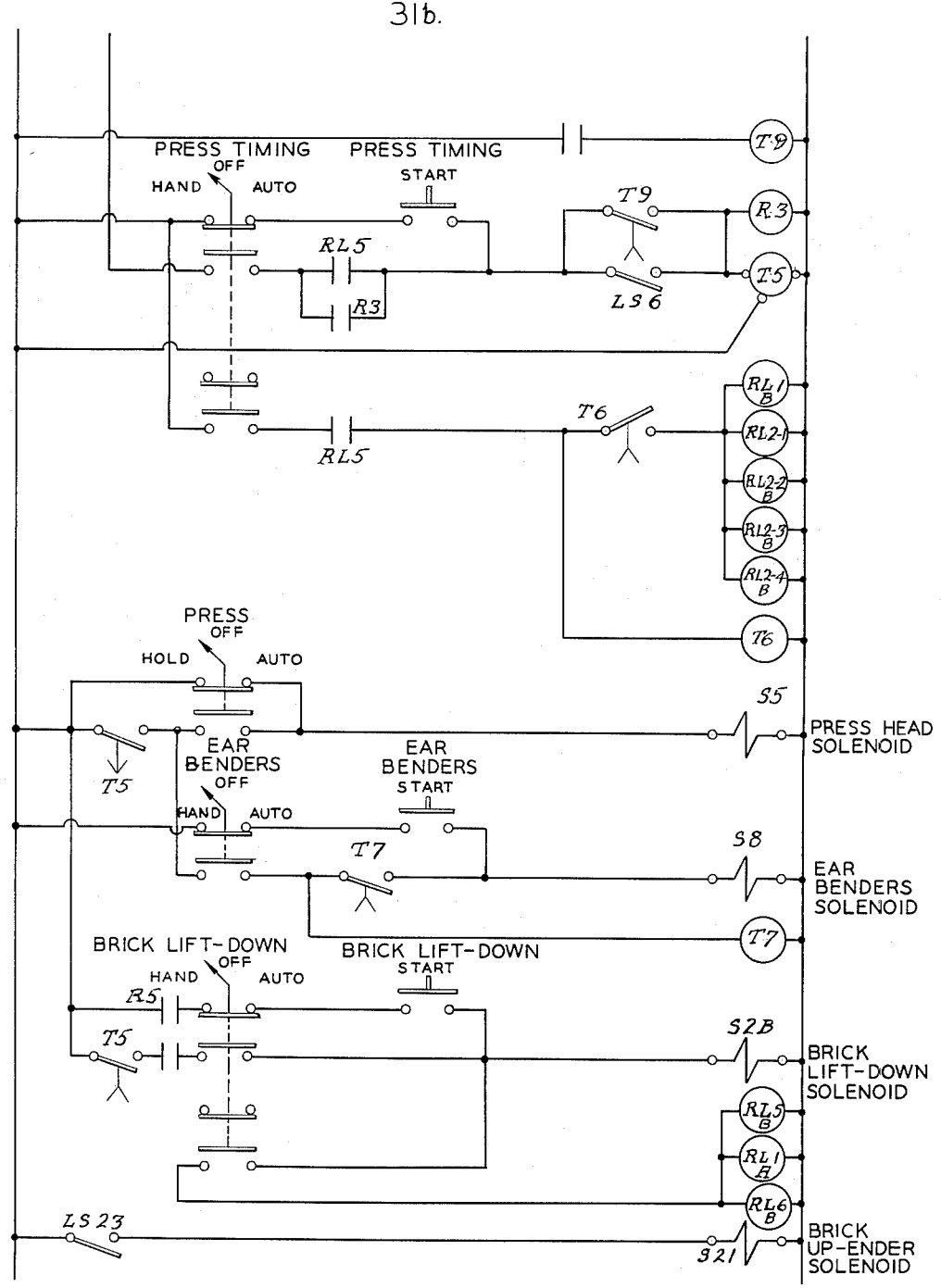

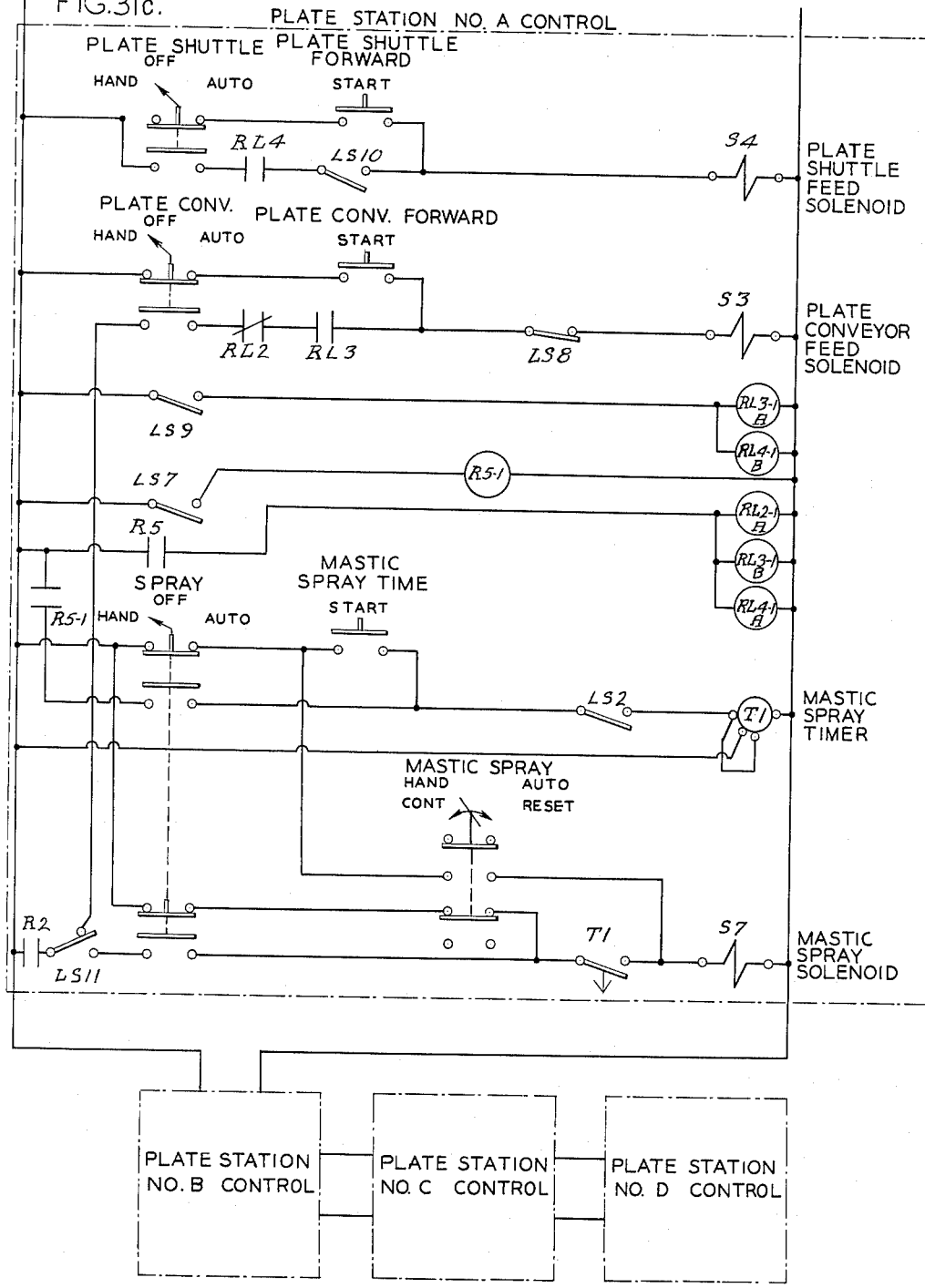

July 19, 1966  R. M. FOCHT  3,261,738
APPARATUS FOR PLATING BRICKS
Filed Nov. 29, 1962  15 Sheets-Sheet 15

INVENTOR:
ROBERT M. FOCHT
BY
Howson & Howson
ATTYS.

United States Patent Office 3,261,738
Patented July 19, 1966

3,261,738
APPARATUS FOR PLATING BRICKS
Robert M. Focht, Lansdale, Pa., assignor to E. J. Lavino and Company, Philadelphia, Pa., a corporation of Delaware
Filed Nov. 29, 1962, Ser. No. 240,799
22 Claims. (Cl. 156—363)

The present invention relates generally to the plating of refractory bricks and more specifically to a method and apparatus for effecting a rapid and automatic application of metal facing plates to refractory bricks.

Prior to the present invention, refractory bricks have been plated by a variety of methods including the use of liquid adhesives. A major difficulty with liquid adhesives is the necessity of drying the adhesive following application on the brick to develop a sufficient shear strength of the adhesive to maintain the plates in position during further processing. A competitive plating technique must be a continuous fast-moving process which cannot be delayed by the attachment of clamping devices or the like to the plated bricks to prevent movement of the plates during setting of the adhesive. For production purposes, it is essential that the bricks immediately following plating be in condition for handling and packing. The process utilizing a liquid adhesive can achieve such a result only by use of elaborate apparatus for wetting the brick surfaces with adhesive and then drying the applied adhesive to such a degree as to sufficiently hold the subsequently applied plates. The maintaining of a uniform drying process is dependent upon a uniform application of adhesive to the bricks followed by a carefully timed and controlled application of heat to drive off the volatile adhesive solvents. Such a process is by nature slow moving, difficult to coordinate, and expensive to set up and operate.

The present invention overcomes the above difficulties by utilizing a heavy extrudable non-liquid mastic adhesive rather than the surface-wetting liquid adhesives commonly employed. Not only is the drying step eliminated due to the fact that the initial shear strength of the mastic as applied is sufficient to maintain the plates in position, but it has been found that the mastic initially need not be uniformly applied over the surfaces to be joined but may be locally deposited on one of the surfaces and thereafter spread by a pressurized application of the plates to the bricks. It has been found that the mastic will flow under pressure to provide a uniform continuous adhesive coating between the brick and plate surfaces.

A further aspect of the present invention is the development of apparatus for carrying out the mastic adhesive process in a rapid and fully automatic manner. The apparatus is characterized by automatic brick feed and positioning means, plate feeding and adhesive applying means, a plating station at which the four sides of a brick are plated simultaneously, as well as an automatic marker for marking the brick type directly thereon.

It is accordingly a first object of the present invention to provide a brick plating process wherein plates are bonded to brick surfaces by a heavy extrudable mastic which is distributed by the pressure of the brick and plate surfaces over a substantial area of the surfaces and which as applied is characterized by an initial shear strength sufficient to maintain the plates in position on the brick surfaces during further processing and handling of the bricks.

A further object of the invention is to provide an apparatus for plating bricks which provides a fully automatic plating process including the application of adhesive, pressing of the plates upon the bricks to distribute the adhesive and set the plates in their proper position, and a bending of plate tabs as required.

An additional object of the invention is to provide a brick plating machine as described which will automatically plate the four sides of a brick simultaneously.

Still another object of the invention is to provide a brick plating machine as described which will effect a uniform plating of the bricks at a high rate of speed.

Additional objects and advantages of the invention will be more readily apparent from the following detailed description of an embodiment thereof when taken together with the accompanying drawings in which:

FIG. 1 is a plan view of a brick plating apparatus in accordance with the present invention;

FIG. 6 is a sectional view taken vertically through the apparatus along line 6—6 of FIG. 2;

FIG. 7 is an elevational view taken along line 7—7 of FIG. 2;

FIG. 8 is a partial view of the apparatus as shown in FIG. 6 showing the brick plating station of the apparatus with a brick engaged in the plating position;

FIG. 9 is a perspective cutaway view of a brick in the plating position of FIG. 8 showing in particular the operation of the tab bending linkage;

FIG. 10 is an elevational view showing a portion of the plate positioning unit in a vertical position and the manner in which a plate is released upon reaching a vertical position;

FIG. 11 is a perspective view of a plated brick end showing the bent plate tabs;

FIG. 12 is a plan view taken along line 12—12 of FIG. 7;

FIG. 13 is a view taken along line 13—13 of FIG. 1;

FIG. 16 is a view taken along line 16—16 of FIG. 1 showing a plate station and adhesive application station;

FIG. 17 is a view taken along line 17—17 of FIG. 16;

FIG. 18 is a view taken along line 18—18 of FIG. 16 showing the disposition of the adhesive applying nozzles above a plate;

FIG. 19 is a view along line 19—19 of FIG. 16;

FIG. 20 is a schematic central sectional view of the apparatus showing the paths of travel of the plates and bricks;

FIG. 21 is a view taken along line 21—21 of FIG. 6;

FIG. 22 is a view taken along line 22—22 of FIG. 6;

FIG. 23 is a view taken along line 23—23 of FIG. 6;

FIG. 24 is a perspective view of the plate guide assembly;

FIG. 25 is a view taken along line 25—25 of FIG. 20;

FIG. 26 is a view as in FIG. 25 following advance of the brick feed unit;

FIG. 27 is a perspective view of a plate as it appears prior to application;

FIG. 28 is a perspective view of an unplated refractory brick;

FIG. 29 is a perspective view of a refractory brick plated in accordance with the present invention;

FIGS. 31a–31f are an elementary diagram of the electrical circuits of the apparatus;

FIG. 31 is an elevational view showing a modified adhesive applying station; and FIG. 32 is a view along line 32—32 of FIG. 31.

Figure 2:
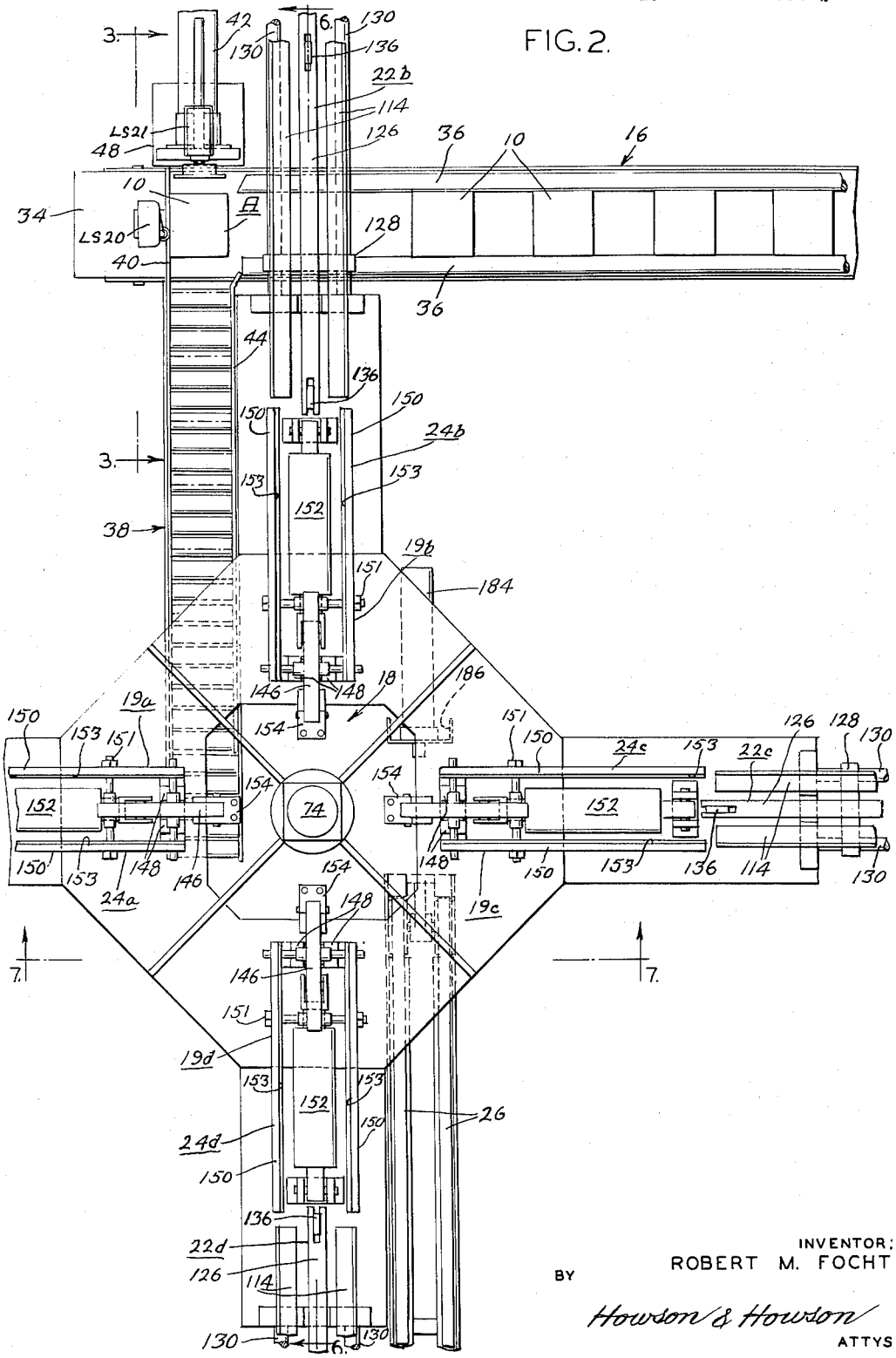
FIG. 2 is an enlarged plan view of the central portion of the apparatus shown in FIG. 1.

Referring to the drawings, FIG. 28 shows the type of refractory brick 10 on the surface of which the illustrated apparatus is adapted to apply facing plates. FIG. 27 shows a plate 12 prior to application, and FIG. 29 shows a plated brick. In the particular embodiment illustrated, two opposing plates include ear or tab portions 14 which are bent against an end face of the brick to further secure the plates. It should be understood that the size and shape of the brick and plates as well as the shape and number of the tabs may be varied to suit particular needs, and that the brick shape and plate arrangement is shown solely by way of example.

The method of the invention will be presented in conjunction with the description of the apparatus for carrying out the process.

A general understanding of the basic structure and operation of the apparatus may be gained by reference to the plan view of FIG. 1 and the schematic elevational view of FIG. 20. The unplated bricks 10 are loaded on brick infeed conveyor 16 and are advanced and raised into central elevated brick plating station 18. Four plate stations 19a, b, c, and d extend outwardly oriented at 90 degree intervals from the plating station and include plate loading stations 20a, b, c, and d, and plate conveyors 22a, b, c, and d. Stacks of plates are inserted into the four plate loading stations and are sequentially advanced by the plate conveyors through adhesive applying stations (not shown in FIG. 1) onto plate positioning units 24a, b, c, and d. The four plate stations serve to advance four adhesive-carrying plates simultaneously to the central brick plating station 18 for application to the four sides of a refractory brick 10. The corresponding components of the four plate stations are of the same construction.

The plate positioning units 24a, b, c, and d, transfer the plates to a vertical position from which they slide into the plating station parallel with the vertical brick surfaces and spaced therefrom. Pneumatic cylinders 25a, b, c, and d of the plating station then press the plates against the brick surfaces causing a distribution of the mastic adhesive and a bonding of the plates to the brick. The plate tabs 14 are bent automatically at the brick plating station during the pressing cycle. The plated bricks are transferred from the brick plating station and are knocked down and advanced in a horizontal position along the discharge conveyor 26. The bricks are again vertically oriented at the brick up-ending station 28 from which they pass through the marking station 30 and onto brick outfeed conveyor 32.

All of the above operations take place automatically, the machine taking flat plates and unplated bricks and producing finished, marked, plated bricks. Although the mastic adhesive is not permanently set at the time of discharge of the plated bricks from the machine, the shear strength of the adhesive is such that the plates are not dislodged from their proper positions by further handling and packing.

The particular details of the apparatus are described in relation to the respective flow paths and operations involved. Specifically these are the conveying and positioning of the bricks into the plating position, the conveying and positioning of the plates into the plating position including the application of adhesive, the plating operation and bending of the plate tabs, and the discharge and marking of the plated bricks.

Figure 3:
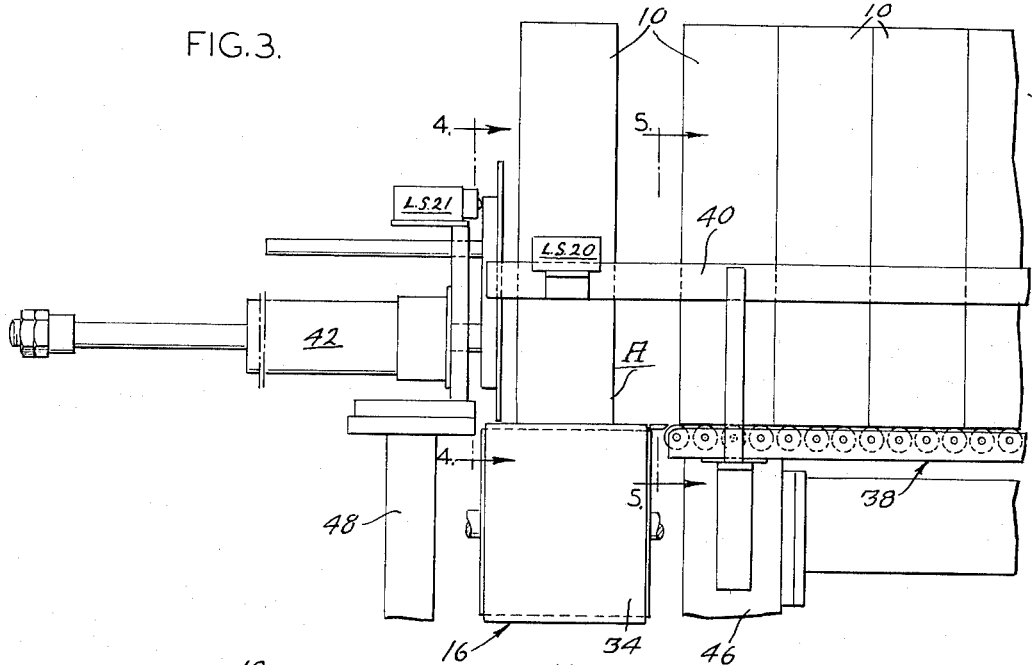
FIG. 3 is an elevational view taken along line 3—3 of FIG. 2 showing details of the brick infeed conveyor.
Figure 4:
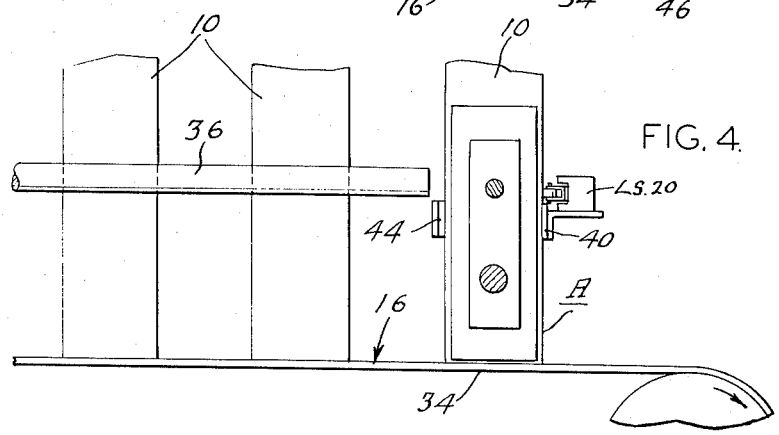
FIG. 4 is a view taken along line 4—4 of FIG. 3.

Dealing first with the mechanism for conveying and positioning the bricks, FIGS. 2–4 show infeed conveyor 16 comprising a suitably supported belt 34 driven by motor M–2 and drive 35 (not shown). The bricks are loaded manually on the belt 34, disposed on end in the spaced manner shown. Guide rails 36 are positioned above the conveyor to maintain the bricks in proper alignment.

On reaching position "A" shown in FIGS. 2 and 3, the bricks are transferred to roller conveyor 38 disposed perpendicularly to belt 34. Each brick upon reaching the transfer point contacts limit switch LS-20 on the extending roller conveyor brick guide 40 thereby energizing a solenoid valve and actuating brick infeed cylinder 42 which pushes the brick onto the roller conveyor. Since the brick advance along the roller conveyor is controlled by infeed cylinder 42, appropriate electrical and pneumatic circuitry is employed to provide an actuation of the cylinder which is synchronized with the other machine elements. Similarly, the motion of the infeed conveyor 16 is controlled in a manner to be later explained so that a brick is advanced only when the infeed cylinder is in a position to receive it and so that subsequent bricks are not advanced until the cylinder has completed its brick advancing cycle.

Figure 5:
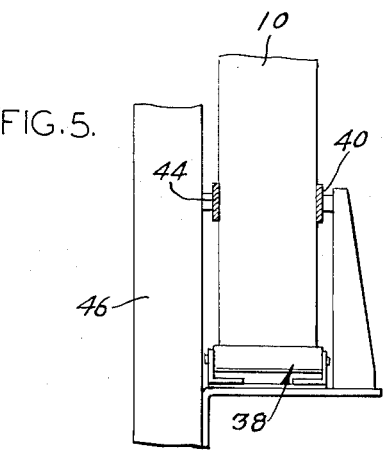
FIG. 5 is a view taken along line 5—5 of FIG. 3.

The bricks are accurately aligned in abutting disposition on roller conveyor 38 by parallel guides 40 and 44 positioned above the conveyor. As shown in FIGS. 3 and 5, the conveyors and infeed cylinder are rigidly secured to frame members 46 and 48 by suitable means such as by bolting or welding the elements involved.

The bricks are advanced by the infeed cylinder along conveyor 38 to the brick nesting station which broadly describes the central conveyor-level area of the machine most clearly shown in FIG. 12. Brick feed unit 48 provides a three-walled enclosure for a brick entering the nesting station from conveyor 38. The brick upon reaching position "B" of FIG. 12 is halted by stops 50 of frame plate 52 of the brick feed unit which is secured perpendicularly to brick feed plate 54 actuated by brick feed cylinder 56. The third side of the brick is enclosed by sliding shuttle plate 58 which is connected through linkage 60 with cylinder 62.

The function of the brick feed unit 48 is to advance the brick from position "B" to position "C" where it is centered over brick lifting cylinder 64 by the three enclosing walls of the positioning unit, namely plates 54 and 58, and stops 50, in conjunction with brick positioning plate 66 which is actuated toward cylinder 64 by cylinder 68 during movement of the brick to position "C." In order to move the preceding brick from position "C," as shown more clearly in FIGS. 7 and 20, brick ejecting plate 70 is secured to sliding plate 58 by spacing members 72.

Brick feed cylinder 56 is actuated when a brick reaching position "B" contacts limit switch LS–1 shown in FIG. 7. Providing that electrical circuits to be later described indicate conditions are suitable, the brick is advanced to position "C" in the manner shown most clearly in FIGS. 20, 25, and 26. Referring to FIG. 20, a brick is shown advanced to position "B" but the positioning unit cannot further advance the brick position "C" since cylinder 64 is supporting the preceding brick in position "D" in the plating station.

When cylinder 64 is retracted returning the raised and plated brick to position "C," cylinder 56 is actuated along with cylinder 68 thereby nesting a brick into position "C" and at the same time by means of ejecting plate 70, moving the plated brick laterally into position "E." Upon nesting of the brick over the cylinder 64, cylinder 62 retracts shuttle plate 58 and the attached ejecting plate, and cylinder 64 lifts the bricks into plating position "D." Cylinders 56 and 68 are retracted to accept the succeeding brick, the retraction of shuttle plate 56 permitting clearance of the elevated rod of cylinder 64. As shown in FIGS. 7 and 20, clamping cylinder 74 actuated in conjunction with lifting cylinder 64 holds the bricks in the desired vertical position during elevation and descent thereof between positions "C" and "D."

Having considered the structure and function of the apparatus involved in advancing the bricks into the plating station, the elements and operation of the plate stations are next considered. Referring to the schematic view of FIG. 20, plate stations 19a and 19c are illustrated in simplified form. Inasmuch as the components of the four plate stations are identical, a single numerical designation will be henceforth applied to each element to simplify the description thereof.

Plates are stacked in the loading station 20 from which they are individually removed by a magnetic pickup head and transferred to a horizontal plate conveyor. The plates are intermittently advanced through an adhesive applying station and adhesive is locally applied to the upper plate surfaces. On reaching the plate positioning units 24, the plates are raised into a vertical position from which they are released and dropped vertically into the plating station adjacent the respective brick faces against which they are to be applied.

The particular structural elements of a plate station are shown in FIGS. 16 and 17. A vertical plate station frame 80 includes horizontal members 82 to which are attached vertical plate guides 84 appropriately spaced to align the stacked plates. An upper plate hopper 86 is formed by vertical guides 84 and pivotally mounted plate stack retaining latches 90 rotatably mounted about pins 92. The latches include inwardly projecting plate supporting elements 94, the lower edges of which are beveled to allow a reserve stack of plates from lower hopper 88 to be elevated into the upper hopper 86 by wedging the plate stack retaining latches apart through contact with the beveled plate supporting elements. Springs 96 attached to the frame 80 return the retaining latches to their proper stack-retaining position following introduction of a new plate stack from below. The weight of the stack on the supporting elements maintains the supporting position of the latches, and screw stops 98 bearing against bumper blocks 100 on the frame prevent inward movement of the latches.

Plate pickup head 76 backed with permanent magnets 102 is lowered by plate lift cylinder 78 to magnetically attach the top plate of the upper stack, guide means 104 maintaining the proper alignment of the pickup head. When the pickup head reaches the raised position with a plate attached, plate sensing rod 106 extending through the face of the pickup head contacts a limit switch, actuating plate shuttle cylinder 108. This cylinder advances parallel plate shuttle rods 110, to the ends of which are attached plate-engaging fingers 112. The fingers are disposed so as to pass along the sides of the pickup head 76, engaging the back edge of a plate and sliding it horizontally along the surface of the pickup head onto plate conveyor track 114, which as shown in FIGS. 18 and 19 consists of spaced parallel angles 116 rigidly attached to the plate station frame 80.

As indicated above, an arrangement is provided to permit a lower stack of plates to be moved into position from below when the stack in the upper hopper is exhausted. The plates in lower plate hopper 88 rest on plate stack lift platform 118 which is attached to the piston of the plate stack lift cylinder 120 and includes guide 122 to maintain correct alignment thereof. The lower plate hopper 88 is filled with plates while plates are being removed from the upper hopper 86 by pickup head 76. When the plate stack in the upper plate hopper 86 reaches a low level, the pickup head 76 on its pickup stroke contacts a pilot valve and plate stack lift cylinder 120 moves upwardly raising the stack in the lower hopper through retaining latch 90 into the upper hopper. Springs 96 return the retaining latches 90 to their supporting position and the plate stack lift platform 118 is returned to its loading position.

The plates after being moved onto plate conveyor track 114 from the pickup head are advanced along the track by conveyor arm 126 slidably disposed below and between angles 116. The conveyor arm is mounted on supports 128 adapted to slide on parallel rails 130 extending between the plate station frame 80 and the central plating station frame. Conveyor arm 126 is reciprocated by pneumatic cylinder 132 to which it is attached by member 134. Spaced spring-loaded pivotally mounted dogs 136 are mounted in notches in the member 126 as shown in FIG. 18. The dogs in the raised position present a perpendicular face toward the plating station and a sloping face toward the plate loading station, which shape permits the dogs to engage the back edge of plates on the plate conveyor track and advance the plates toward the plating station. On the return stroke of the member 126, the dogs are depressed by contact of the sloping faces with the plates. The plates are thus intermittently advanced along the conveyor track by reciprocation of conveyor arm 126.

One position at which the plates stop during their intermittent travel across the plate conveyor track constitutes an adhesive applying station which includes a battery of adhesive applying nozzles 138 attached to support means 140. The support means include a horizontal rod 142 parallel with the plate track along which the guns may be spaced as desired by means of clamping screws 144.

The guns of the embodiment illustrated as shown in FIG. 19 are of a type which includes an air operated control valve, and the plastic adhesive is applied by the force of its own pressure such that air is not introduced into the adhesive. The adhesive, in this instance a heavy extrudable mastic, is locally applied in small spaced deposits along the center of the plate as shown in FIGS. 18 and 19. The air valves of the guns are actuated by a limit switch contacted by conveyor arm 126 upon completion of a conveyor arm advance stroke as shown in FIG. 6. A timer controls the length of time that the spray guns are actuated for each plate.

The plates with the mastic deposits on the upper surfaces thereof are advanced along the plate conveyor track onto plate positioning units 24. As shown in FIGS. 1, 6, and 7, each of the four plate positioning units includes a central member 146 pivotally connected to boss 148 on the central machine frame. Guide bars 150 are held in spaced parallel position by bolts 151 passing through member 146. The guide bars are slotted as indicated at 153 in FIG. 10 to accept the edges of plates advanced from the plate conveyor.

Cylinders 152 attached to the central machine frame are connected with member 146 to actuate the plate positioning units into the vertical position indicated in FIG. 20. The cylinders 152 are actuated when the brick clamping cylinder 74 reaches its uppermost position.

Plate retaining latches 154 are pivotally mounted on the inner ends of central members 146. The latches are held in the plate retaining position by springs 156 to prevent the plates from sliding out of the guide bars. When the vertical position is reached, the plate retaining latches are tripped by contact with stop bars 158 on the machine frame as shown in FIG. 10, permitting the plates to slide downwardly into the plating station.

The plating station, into the center of which an unplated brick has been advanced by the brick lifting cylinder 64 as previously described, includes press heads 160a, b, c, and d, actuated by press head cylinder 25a, b, c, and d, mounted on the central machine frame. Press head mounting arrangement 162 permits movement of the press heads with respect to the press cylinders to compensate for possible brick irregularities thereby insuring an evenly distributed pressure between the plates and the bricks. Guide means 164 prevent rotation of the press heads.

Spring-loaded plate stops 166 extend inwardly from the lower ends of the press heads 160 to receive the plates dropping from the vertically disposed plate positioning units. As shown in FIG. 9, the plate stops are moved outwardly against spring pressure when the press heads are advanced against a brick. The plates when clamped between the press heads and the brick surfaces no longer require the support of the stops.

Referring to FIGS. 21–24 a plate guide assembly 168 is disposed vertically along each side of each press head to prevent the plates from falling inwardly prior to pressing. The plate guide assembly comprises guide plates 169 mounted on adjustably positionable shaft 170 and includes inwardly extending plate guide fingers 171 at upper and lower locations which serve to position the plates in alignment with the corresponding brick surfaces. The plate guide fingers are disposed at a slight angle to channel the plates into position.

Inner plate guides 172 comprising beveled plate retaining strips 174 are supported by spring elements 176 along the forward edge of the guide plates 169. As shown in FIG. 21, the plates on dropping into the plating station onto plate stops 166 are initially restrained from inward movement by the inner plate guides 172. When the press heads are actuated, the inner plate guides are moved outwardly against the force of the spring elements 176 to provide clearance for the plates and press heads.

With respect to the elements previously described, the four press head units are identical. However, in the arrangement shown, press heads 160a and 160c include a tab bending assembly 178 to bend the tab or ear portions of two of the opposed plates along the bottom surface of the brick as illustrated in FIGS. 9 and 11. The details of the ear bending assembly may be seen in FIGS. 7 and 8 to include pivotally mounted ear bending arm 180 linked to pneumatic cylinder 182. In FIG. 7 arm 180 is shown in the withdrawn position from which it is advanced to the extended position of FIG. 8 during the plate pressing cycle. Cylinder 182 is actuated to thrust the lower end of arm 180 against the plate ear, bending it flat against the lower surface of the brick.

To summarize the sequence of operations in the plating station, a brick is elevated by brick lifting cylinder 64 into plating position at the same time that plates are dropped from the plate positioning units into plating position. The press heads 160 are then advanced as shown in FIG. 8 and the plates are guided by the plate guide assemblies into their correct positions on the respective brick surfaces. While the plates are clamped against the brick by the press heads, the ear bending assemblies are actuated to bend the plate ears as illustrated in FIGS. 8 and 9. The press head cylinders and ear bending cylinders are then actuated to withdraw the press heads and ear bending arms, and the plated brick is lowered by the brick lifting cylinder to the position "C" described above and illustrated in FIGS. 7 and 20.

Figure 14:
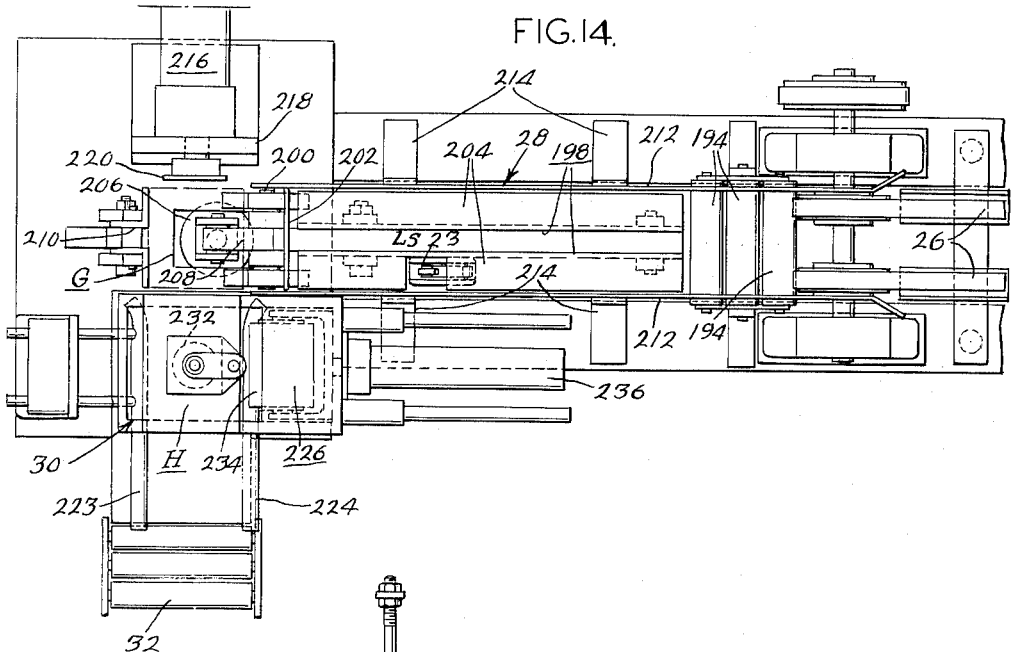
FIG. 14 is a view taken along line 14—14 of FIG. 13.

With reference to FIGS. 12 and 13, as previously described, the plated brick after being lowered to position "C" is advanced laterally by brick ejecting plate 70 into position "E." The plated brick is then knocked into a horizontal position by cylinder 184 attached to the machine frame by bracket 186. The bricks fall horizontally onto discharge conveyor 26 driven by motor 190 through reduction gear drive 192. The bricks pass from the conveyor across transition rolls 194 onto the brick upending unit 28. This unit, illustrated in FIGS. 13–15, includes brick upending carriage 198 pivotally mounted to an appropriate frame at 200. The brick carriage, shown in FIG. 13 in the lowered brick receiving position, consists of a vertical brick-stopping element 202 and horizontally extending platform 204.

The carriage 198 is pivotally actuated into a vertical position by brick upending cylinder 206 connected with crank 208 secured to the carriage. A brick on contact with limit switch LS23, shown in FIG. 13 extending through platform 204, energizes a solenoid which actuates the brick upending cylinder causing the carriage to be swung into a vertical position, advancing a brick to position "G." Backstop 210 prevents the upended brick from toppling and positions the brick for further advancement. Vertical brick guides 212 are supported by brackets 214 along the sides of the transition rolls and brick upending carriage to insure the proper disposition of the bricks.

A brick on reaching position "G" contacts pilot valves, one of which returns the upending cylinder and upending carriage to its horizontal position. The other valve actuates brick advance cylinder 216 mounted on brackets 218 which by means of pusher plate 220 advances the brick to position "H" in brick marking station 30. Guide rod 222 prevents rotation of plate 220.

The plated brick is located at position "H" by adjustable guides 223 and 224 beneath brick marking assembly 226 mounted on adjustable standard 228. The marking assembly includes a printing pad 230 mounted for vertical actuation by printing cylinder 232 when the brick is positioned beneath the printing pad. Printing pad inking roller 234 is horizontally actuated by inking cylinder 236 to ink the printing pad 230 prior to marking of each brick. Cylinder 236 is returned to the withdrawn position following actuation.

Figure 15:
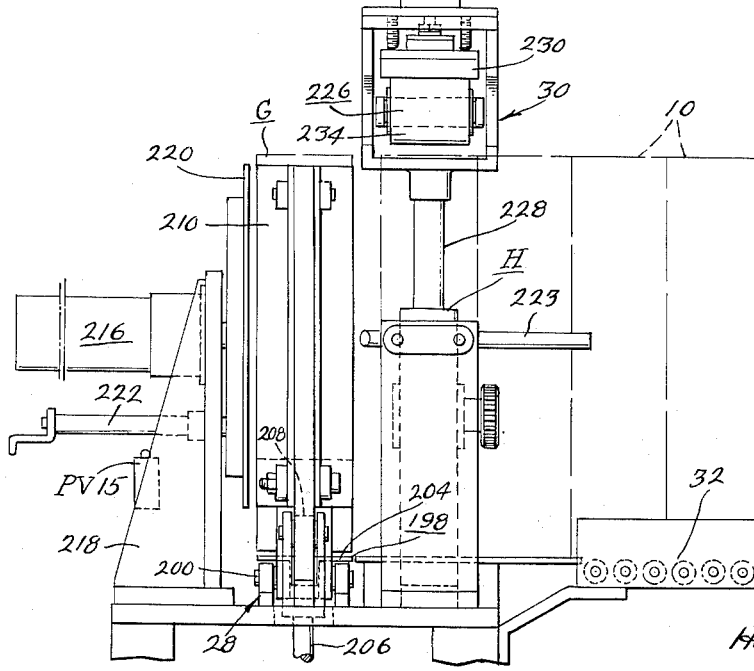
FIG. 15 is a view taken along line 15—15 of FIG. 13.

The bricks are advanced from position "H" by movement of the succeeding bricks into the printing position. As shown in FIG. 15, the bricks advance in abutting relation from the printing station onto brick outfeed conveyor 32.

A modified method and apparatus for applying mastic to the plates is illustrated in FIGS. 31 and 32. The modified apparatus utilizes a single spray gun 238 mounted at an angle on support 240. A compressed air jet 242 is positioned below and behind the spray gun orifice. The plate conveyor operation is unchanged for the modified method. However, the limit switch actuated by conveyor arm 126 is contacted shortly after beginning of the plate conveyor stroke and a timer holds the guns open for a predetermined time such that a continuous deposit of mastic is extruded onto the moving plate. Upon completion of the mastic application, the moving conveyor arm trips a pressure valve (not shown) causing a short blast of compressed air from air jet 242 to break the mastic extrusion cleanly from the spray gun orifice.

The mastic is preferably under such pressure that the deposit is extruded from the gun at a rate exceeding the rate of travel of the moving plate such that an irregular or "squiggled" mastic deposit is produced. It has been found that such a continuous local deposit along the longitudinal axis of the plate provides a surprisingly uniform layer of mastic extending over a substantial area of the brick surfaces following application of pressure at the plating station. The amount and position of the adhesive applied must be carefully controlled to provide a satisfactory adhesive layer.

The pneumatic and electrical circuitry of the apparatus has been schematically illustrated in FIGS. 30, and 31a–f of the drawings and will be described briefly to point out the important operational concepts involved.

Figure 30:
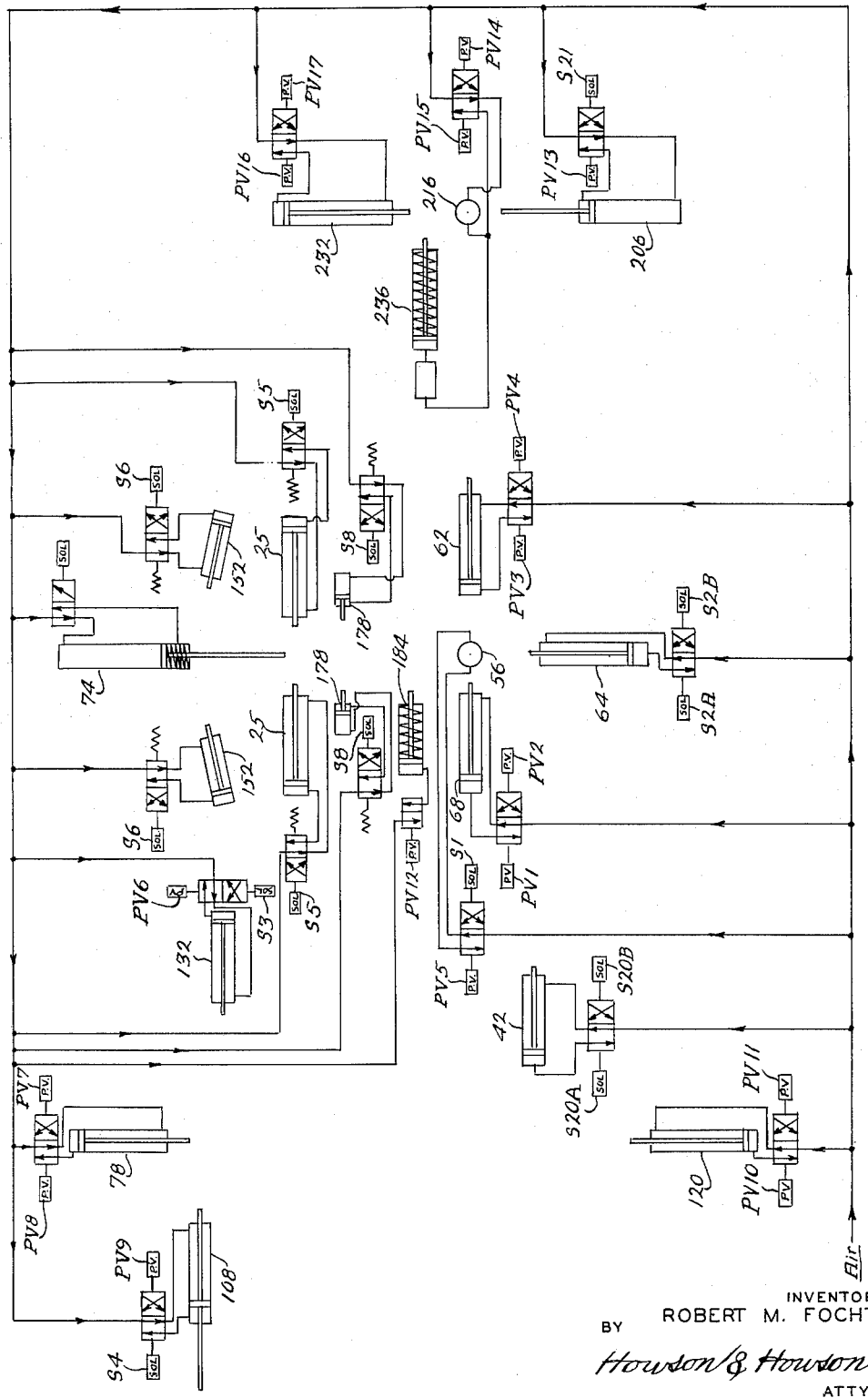
FIG. 30 is a schematic view of the pneumatic circuits incorporated in the apparatus.
Figure 31A:
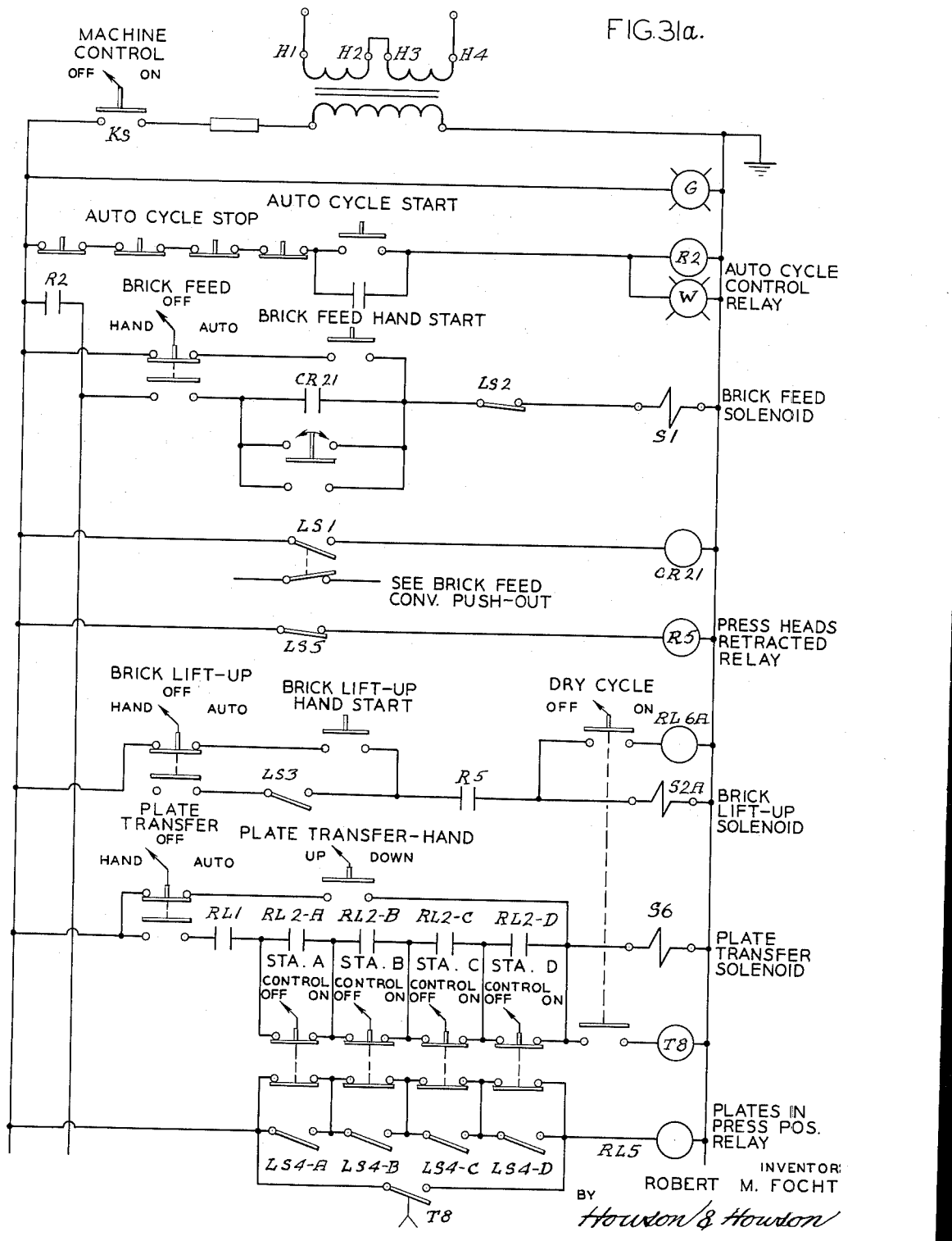

The pneumatic circuits are shown in FIG. 30. The electrical circuits of FIGS. 31a and 31b pertain to the central brick advancing and plating station controls. FIG. 31c shows the electrical circuitry of a single plate station including the adhesive station controls. The three other identical plate station control circuits are indicated schematically by boxes at the bottom of the figure.

Figure 31D:
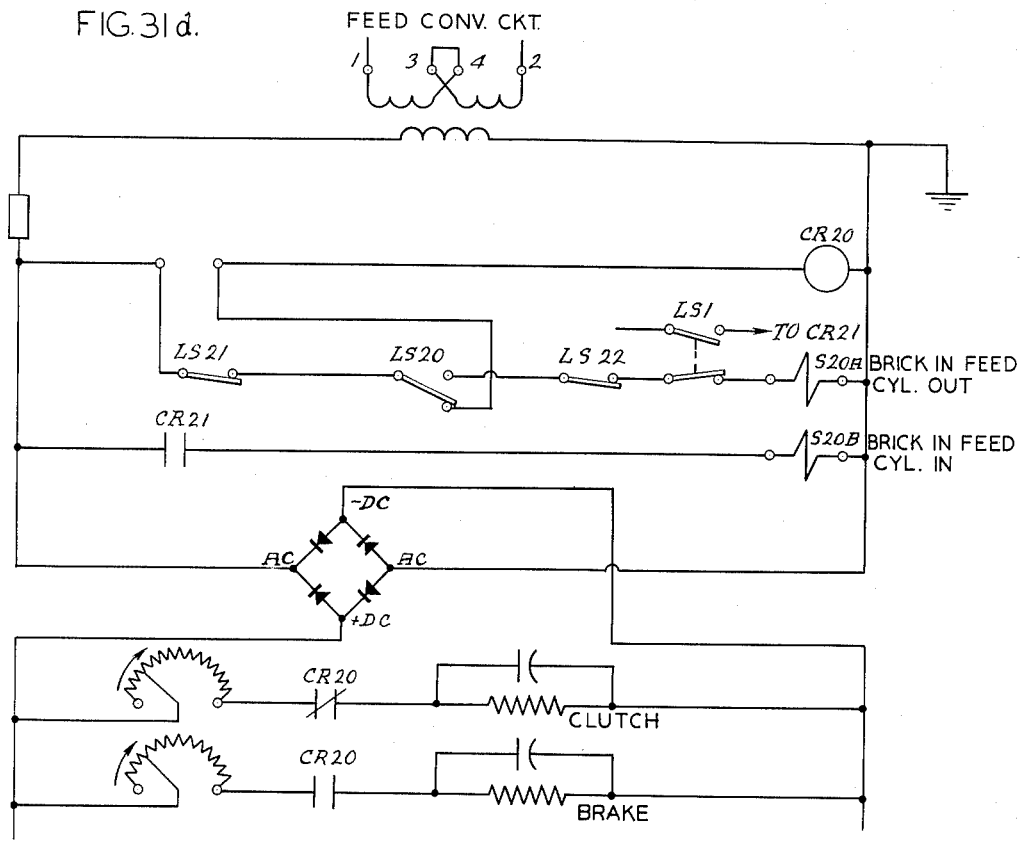
Figure 31E:
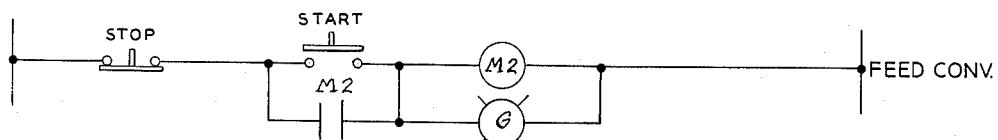
Figure 31F:
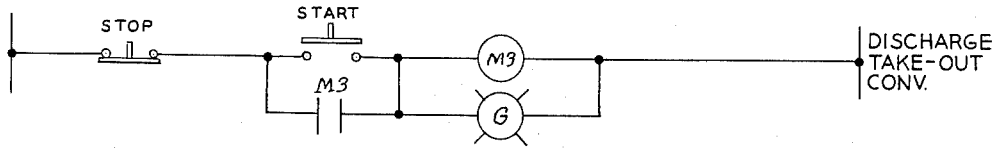

FIG. 31d shows the circuits controlling the infeed of bricks into the brick feed unit. FIGS. 31e and 31f show the motor controls for the brick infeed conveyor and the brick discharge conveyor.

The infeed of bricks into the plating station is controlled by limit switches adjacent the brick feed unit which in turn control the torque transmitted by the infeed conveyor drive 35. A brick on reaching position "B" closes limit switch LS1 shown in FIG. 7 thereby closing switch CR21. When the brick lifting cylinder 64 is in the down position closing limit switch LS2, brick feed solenoid S1 is energized actuating cylinder 56 advancing the brick feed unit to move the brick to position "C." Pilot valve PV3 is actuated when the brick reaches position "C" moving cylinder 62 and shuttle plate 58 outwardly. The shuttle plate strikes pilot valve PV5 returning the brick feed unit back to its original position which in turn actuates pilot valve PV4 returning the shuttle plate 58 to the brick-nesting position.

Referring to the brick infeed cylinder circuit, limit switch LS21 is closed when infeed cylinder 42 is retracted and, if no brick is in position "A," limit switch LS20 is open energizing CR20 to provide full drive torque to infeed conveyor 16. When a brick reaches position "A," limit switch LS20 is closed and switches CR20 are reversed halting the infeed conveyor. If LS22 is closed indicating the brick infeed unit to be in brick receiving position and if LS1 is open indicating the brick feed unit to be empty, solenoid S20A is energized actuating brick infeed cylinder 42 and advancing the brick is position "A" and the abutting row of bricks on conveyor 38 to move a brick to position "B." Limit switch LS1 is then closed and solenoid S20B is energized to return the brick infeed cylinder 42.

The brick infeed conveyor and infeed cylinder are thus seen to operate intermittently in response to a brick advance requirement signaled by the plate feed unit limit switches. The infeed conveyor moves a brick into position "A" when cylinder 42 is withdrawn and the cylinder advances the brick onto conveyor 38 upon demand.

The advance of the brick feed unit contacts pilot valve PVI actuating cylinder 68 to extend the brick positioning plate 66. Upon return of the brick feed, pilot valve PV2 is tripped to return the brick positioning plate.

As shown in FIG. 6, the retraction of the press heads closes limit switch LS5. When the brick feed unit has advanced a brick into position "C" closing limit switch LS3, if the press heads are retracted closing limit switch LS5, then the switch R5 is closed and the brick lift-up solenoid S2A is energized and cylinder 64 is actuated to elevate the brick into the plating station. It may be noted that four plates must be in the press position closing the LS4 limit switches to close switch RL5 before the press head solenoid can be energized.

Referring to the plate station controls shown in the elementary diagram of FIG. 31c, the conveyor arms on advancing plates onto the plate positioning units contact limit switches LS7 closing the four RL2 switches. Solenoid S6 is thus energized actuating cylinders 152 to drop the plates into the press position providing the press heads are retracted closing switch R5, and providing there are no plates already in position closing the LS4 limit switches. The plates in press position close the LS4 switches thereby closing switch RL5 and actuating the press cylinders through solenoid S5, providing the brick lift cylinder is at the top of its stroke closing limit switch LS6.

Timer switch T6 operates to return the plate positioning units to the horizontal position after releasing the four plates thereby closing the LS8 limit switches. Providing the plate shuttle cylinders 108 are extended having moved plates onto the conveyor tracks and closing the LS9 limit switches, the plate conveyor solenoids S3 are energized to actuate cylinders 132 moving the conveyor arms outwardly. The conveyor arms on completing the outward strokes contact pilot valves PV6 to reverse cylinders 132 and advance the plates on the conveyor.

Plate shuttle solenoids S4 actuate the plate shuttle cylinders 108 upon the closing of limit switches LS7 by the conveyor arms advance when limit switches LS10 indicate that plates are attached to pickup heads 76. The plate shuttle cylinders at the ends of their inward strokes contact pilot valves PV7 actuating plate cylinders 78 to lower the plate pickup heads. Pilot valves PV9 are contacted at the bottom of the plate pickup strokes to return the plate shuttle cylinders. The return strokes of the plate shuttle cylinders trip pressure valves PV8 to raise the pickup heads.

As described above, the plate stack lift cylinder is raised when the supply of plates in the upper hopper is lowered to the point where the plate pickup heads contact pressure valve PV11. The plate stack cylinders are returned upon completion of their upward strokes by contact with pressure valves PV10.

The adhesive guns 138 are controlled by the LS7 limit switches. Timers T1, T2, T3, and T4 control the length of time that the gun valves are open for each station.

With four plates in the plating position closing the LS4 limit switches, and with the brick lifting cylinder 64 in the fully raised position closing limit switch LS6, the press head solenoid S5 is energized closing the press heads. The press heads remain closed through the time delay setting of timer T5 and then return to the retracted position. Following closing of the press heads, the ear bending cylinders 182 are actuated by timer T7 energizing solenoid S8.

Following the timed pressing and ear bending cycles, limit switch LS5 is closed by the opening of the press heads thereby energizing solenoid S2B and lowering brick lifting cylinder 64. The cylinder 64 upon reaching its lower position contacts limit switch LS2 and actuates the plate feed unit to move the plated brick into position "E." On reaching position "E," a plated brick trips pilot valve PV12 actuating brick knockdown cylinder 184 to knock the brick into a horizontal position on the discharge conveyor 26.

A brick contacting limit switch LS23 on the brick upending unit actuates cylinder 206 through solenoid S21 to upend the brick. On reaching position "G," the brick contacts pilot valve PV13 returning cylinder 206, and also contacts pressure valve PV14 actuating cylinder 216 to move the brick to position "H." Cylinder 216 is returned when the pilot valve actuator on guide rod 222 contacts pilot valve PV15.

The inking cylinder 236 is connected with the cylinder 216 circuit such that the cylinders are extended simultaneously. Printing cylinder 232 is downwardly actuated when a brick is in position "H" by the brick upending carriage striking PV16 on reaching the horizontal position. Cylinder 232 on completing its downward stroke is returned by contact with pilot valve PV17.

Conventional controls for manually actuating the various machine components for adjustment and inspection purposes are included in the electrical circuit diagram.

Manifestly, changes in details of construction can be effected by those skilled in the art without departing from the spirit and the scope of this invention as defined in and limited solely by the appended claims.

I claim:

1. Apparatus for simultaneously applying plates to a plurality of brick surfaces comprising a brick plating station, brick feed means for positioning a brick within said plating station with the surfaces to be plated being vertically disposed, a plurality of plate stations extending from said plating station, said plate stations including means for locally applying a mastic adhesive to plates passing therethrough, means for vertically positioning the plates with adhesive applied thereto in the plating station in spaced juxtaposition to the brick surfaces to be plated, pressing cylinders disposed in said plating station adapted to provide a clamping force to simultaneously advance and bias the plates against the faces of a brick positioned therein, and means for removing a plated brick from the plating station.

2. Apparatus for simultaneously applying plates to four surfaces of a brick comprising a central plating station, means for vertically positioning a brick within said plating station, four pressing cylinders transversely disposed at 90 degree intervals in said plating station, four plate stations leading into said central plating station, each of said plate stations including means for locally applying a mastic adhesive to plates passing therethrough and means for conveying plates to said plating station, plate positioning means for positioning plates from the plate stations with adhesive thereon in spaced parallel relation to the four surfaces of a brick positioned within said plating station, said pressing cylinders adapted to simultaneously clamp the plates against the respective brick surfaces thereby distributing the mastic adhesive in a substantially uniform manner between the brick and plate surfaces.

3. Apparatus as claimed in claim 2 wherein said means for positioning a brick within said plating station comprises brick conveyor means, a brick feed unit, brick lifting means, and means for controlling the brick feed rate of said conveyor means, brick feed unit, and brick lifting means to co-ordinate the brick flow with the plating cycle of said plating station.

4. Apparatus as claimed in claim 3 wherein said brick feed unit comprises a pneumatic cylinder, means connected with said cylinder for engaging a brick, and control means for said cylinder adapted to actuate said cylinder to advance a brick onto the brick lifting means in response to a predetermined condition of the lifting means.

5. Apparatus as claimed in claim 4 wherein said brick conveyor means includes pneumatic brick advance means, and control means actuating said brick advance means in response to a predetermined condition of said brick feed unit.

6. Apparatus as claimed in claim 2 wherein said means for applying a mastic adhesive comprises plate conveying means for successively conveying plates to the plating station, an adhesive applying gun positioned adjacent said plate conveying means, a source of adhesive for said gun, and means controlling actuation of said gun to co-ordinate applications of adhesive from said gun onto successive plates on said plate conveying means.

7. Apparatus as claimed in claim 2 including a press head on each said pressing cylinder, connecting means between each said press head and cylinder providing alignment of said press head with the brick surface.

8. Apparatus as claimed in claim 7 wherein said press head includes means for receiving the plates from said means for positioning the plates, and means for supporting the plates between said press head and brick during actuation of the pneumatic cylinder.

9. Apparatus as claimed in claim 8 including plate guide means positioned along said press head to position the plates on the brick surfaces.

10. Apparatus for simultaneously applying metal plates to a plurality of surfaces of refractory bricks comprising a central vertical plating station, brick lifting means for positioning vertically disposed bricks in said plating station, a brick feed unit for advancing bricks onto said brick lifting means, brick conveyor means for advancing bricks into said brick feed unit; a plurality of plate stations extending outwardly from said plating station, each said plate station including horizontal plate conveying means for advancing plates to said plating station, means for applying a mastic adhesive on the plates while on said horizontal conveying means, and means for receiving said plates with adhesive thereon from said horizontal conveying means and vertically introducing the plates into said plating station in spaced parallel relation to the brick surfaces; a plurality of pneumatic cylinders each operatively connected to a press head in said plating station to simultaneously press the plates against the brick surfaces to distribute the adhesive between the plates and brick surfaces and adhere the plates to the bricks, and means for removing the plated bricks from the plating station.

11. Apparatus as claimed in claim 10 wherein said brick conveyor means includes pneumatic brick advance means, and control means actuating said brick advance means in response to a predetermined condition of said brick feed unit.

12. Apparatus as claimed in claim 10 wherein said brick feed unit comprises a pneumatic cylinder, means connected with said cylinder for engaging a brick, and control means for said cylinder adapted to actuate said cylinder to advance a brick onto the brick lifting means in response to a predetermined condition of the lifting means.

13. Apparatus as claimed in claim 10 wherein said brick lifting means comprises a pneumatic cylinder.

14. Apparatus as claimed in claim 10 wherein said means for applying a mastic adhesive comprises an adhesive applying gun positioned adjacent said horizontal conveying means, a source of adhesive for said gun, and means controlling actuation of said gun to co-ordinate applications of adhesive from said gun onto successive plates on said horizontal conveying means.

15. Apparatus as claimed in claim 10 wherein said means for receiving said plates with adhesive thereon from said horizontal conveying means and vertically introducing the plates into said plating station comprises grooved parallel guide bars adapted to receive said plates, the plate edges engaging the grooves in said guide bars, a plate retaining latch disposed at the inner end of said guide bars, means for pivotally swinging said guide bars from a horizontal to a vertical position, and means for releasing said plate retaining latch upon vertical disposition of said guide bars, releasing a vertically disposed plate into said plating station.

16. Apparatus as claimed in claim 10 including connecting means between each said press head and pneumatic cylinder providing alignment of each said press head with a brick surface.

17. Apparatus as claimed in claim 10 wherein each said press head includes means for receiving and supporting a plate between said press head and a brick surface prior to the adhering of the plate to the brick surface.

18. Apparatus as claimed in claim 10 including plate guide means positioned along each said press head to position the plates on the brick surfaces.

19. Apparatus as claimed in claim 10 including means for marking the plated bricks with identifying indicia following removal from the plating station.

20. Apparatus as claimed in claim 10 wherein each said plate station includes a plate hopper adapted to receive a stack of plates, and means for successively transferring plates from said plate hopper onto said plate conveying means.

21. Apparatus as claimed in claim 20 wherein said means for successively transferring plates from said plate hopper onto said plate conveying means comprises a plate lift cylinder positioned above said plate hopper, a magnetic plate pickup head operatively connected with said cylinder, means controlling said plate lift cylinder to cyclically actuate said cylinder in response to a predetermined condition of said plate conveyor means, and means for transferring plates from said pickup head to said plate conveying means.

22. Apparatus as claimed in claim 20 wherein said plate hopper constitutes an upper plate hopper, including a lower plate hopper below said upper plate hopper, said lower plate hopper adapted to receive a reserve stack of plates, and means for raising the reserve stack of plates into said upper hopper.

References Cited by the Examiner

UNITED STATES PATENTS

| 2,140,614 | 12/1938 | Bancroft | 156—295 |
|---|---|---|---|
| 2,522,577 | 9/1950 | Johnson et al. | 156—363 |
| 2,531,660 | 11/1950 | Ziegler | 156—295 |
| 2,626,075 | 1/1953 | Hesson | 156—363 |
| 2,641,297 | 6/1953 | Wilckens et al. | 156—363 |
| 2,976,200 | 3/1961 | Stover | 156—295 |
| 2,981,432 | 4/1961 | Flood | 156—566 X |
| 3,039,516 | 6/1962 | Vinal | 156—556 X |
| 3,067,805 | 12/1962 | Flynn | 156—556 X |
| 3,095,344 | 6/1963 | Sandow | 156—566 |
| 3,140,972 | 7/1964 | Kortick | 156—566 |

EARL M. BERGERT, *Primary Examiner.*

HAROLD ANSHER, *Examiner.*